(12) United States Patent  (10) Patent No.: US 6,671,928 B2
Huang  (45) Date of Patent: Jan. 6, 2004

(54) HINGE ASSEMBLY FOR MONITOR

(76) Inventor: Kuo-Cheng Huang, No. 28, Lane 428, Chung Cheng N. Rd., Sanchung City, Taipei Hsien (TW)

( * ) Notice: Subject to any disclaimer, the term of this patent is extended or adjusted under 35 U.S.C. 154(b) by 0 days.

(21) Appl. No.: 09/862,300

(22) Filed: May 23, 2001

(65) Prior Publication Data

US 2002/0174519 A1 Nov. 28, 2002

(51) Int. Cl.⁷ .............................................. E05D 11/08
(52) U.S. Cl. .............................. 16/340; 16/337; 16/385
(58) Field of Search .......................... 16/319, 337, 340, 16/362, 385

(56) References Cited

U.S. PATENT DOCUMENTS

| | | | | |
|---|---|---|---|---|
| 5,208,944 A | * | 5/1993 | Lu | 16/278 |
| 5,269,047 A | * | 12/1993 | Lu | 16/340 |
| 5,772,351 A | * | 6/1998 | Ching | 16/337 |
| 5,894,633 A | * | 4/1999 | Kaneko | 16/306 |
| 5,937,482 A | * | 8/1999 | Horng | 16/273 |
| 6,081,969 A | * | 7/2000 | Tanahashi et al. | 16/223 |
| 6,108,868 A | * | 8/2000 | Lin | 16/327 |
| 6,163,928 A | * | 12/2000 | Chung | 16/337 |
| 6,408,485 B1 | * | 6/2002 | Wu | 16/337 |
| 6,421,878 B1 | * | 7/2002 | Kaneko et al. | 16/330 |
| 6,430,777 B1 | * | 8/2002 | Lu | 16/340 |

* cited by examiner

Primary Examiner—Gary S. Hartmann
(74) Attorney, Agent, or Firm—Dennison, Schultz & Dougherty

(57) ABSTRACT

A hinge assembly includes a base-side support member and a monitor-side bracket set being pivotally connected to each other at two pivot shafts on the base-side support member. Elastic washers and anti-skidding washers are sequentially put around the pivot shafts with a separate washer of a predetermined thickness disposed between any two adjacent components of the hinge assembly on the pivot shafts. The separate washer is made of a highly pressure-resistant and wear-resistant material, such as high-molecular polymers, including, for example, Teflon, nylon, ABS resin, PC, PW, Bakelite, or other materials having similar properties. When nuts are tightened against the pivot shafts to firmly lock the components on the pivot shafts together with a selected torque, the separate washers separate and prevent such components from direct and frictional contact with one another.

4 Claims, 6 Drawing Sheets

HINGE ASSEMBLY FOR MONITOR

BACKGROUND OF THE INVENTION

The present invention relates to a hinge assembly for monitor, and more particularly to a hinge assembly for monitor in which a highly pressure-resistant and wear-resistant separate washer is disposed between any two adjacent components on two pivot shafts of the hinge assembly before such components are tightly locked together to produce a torque selected depending on the load of the monitor. The separate washers form separating layers and provide good friction surfaces among the components on the pivot shafts, enabling the hinge assembly to have prolonged service life without the need of anti-rust grease or lubricant.

Hinge assemblies have been widely used with monitors, including monitors for general desktop computers and notebook computers, so that monitors could be easily adjusted to a desired angular position relative to users. An important requirement for such hinge assemblies is they must be able to keep the monitors in a stationary state after the monitors have been adjusted to a desired inclination. That is, a monitor would not freely turn downward at the hinge assembly due to its own weight. Moreover, the hinge assembly must be functionally endurable. In the case of a notebook computer, a monitor thereof might be repeatedly turned open, adjusted to a desired inclination, and closed everyday. That is, the hinge assembly of the monitor of the notebook computer works many times everyday. The hinge assembly must be able to support the monitor so that the monitor may stay at a desired inclination without "nodding". As a basic design requirement, the hinge assembly for the monitor of a notebook computer having a service life about three to five years must be able to endure at least 10,000 cycles of turning during this term and must maintain its basic performance in each turning. In general endurance tests of the hinge assemblies for monitors, each hinge assembly is caused to swing by 20 degrees and total 10,000 to 30,000 cycles of swing are done, depending on an actual requirement in the quality of a product. The performance of the tested hinge assembly is checked every 1,000 cycles of swing thereof.

Although most hinge assemblies for monitors known in the art are based on similar design principles, that is, employing a frictional force between rotating parts, they are, however, different in their structures. Most of the known hinge assemblies for monitors are exclusively designed for use with a specific monitor. That is, each hinge assembly for monitor, due to its designed precision, has a structure and specification only suitable for a certain specific type of monitor. When a torque is changed due to, for example, changes in the load of monitor or the arm of force of brackets of the hinge assembly, the hinge assembly would no longer maintain its basic performance. FIGS. 1 and 2 illustrate two conventional hinge assemblies for monitor that represent the currently most widely employed designs in the markets. The first conventional hinge assembly for monitor shown in FIG. 1 includes a high-precision spring that is designed and manufactured at very high precision standard and therefore requires high manufacturing cost. However, such precision spring is not adjustable with changes in the torque of the monitor. Such precision spring also has short usable life. It is subject to quick wearing and loses its function after a high limit of working cycles thereof has been reached. The second conventional hinge assembly for monitor shown in FIG. 2 has a pivot shaft providing a preset frictional force decided through high precision design. Rotating parts on the pivot shaft are then firmly riveted together with a desired torque without the need of a precision spring. The second conventional hinge assembly for monitor, as the first type, is subject to quick wearing. Moreover, the second type of hinge assembly requires frequent application of anti-rust grease or lubricant to ensure its ability of normal operation, resulting in inconveniences in assembling thereof. It is therefore desirable to develop a hinge assembly for monitor that eliminates the drawbacks existing in the conventional products.

SUMMARY OF THE INVENTION

A primary object of the present invention is to provide a hinge assembly for monitor, in which separate washers made of highly pressure-resistant and wear-resistant materials and having a selected thickness are disposed between adjacent components on pivot shafts of the hinge assembly to form separating layers and provide good friction surfaces among the components on the pivot shafts, enabling the hinge assembly to have prolonged service life without the need of anti-rust grease or lubricant.

Another object of the present invention is to provide a hinge assembly for monitor, in which separate washers made of highly pressure-resistant and wear-resistant materials and having a selected thickness are disposed between adjacent components on pivot shafts of the hinge assembly, and the separate washers and other components on the pivot shafts are tightened together with a torque decided by the load of monitor. By locking the components on the pivot shafts to different degrees of tightness, the hinge assembly may be applied to monitors of different torques. Whereby, the hinge assembly could be manufactured and used in a cost effective manner.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
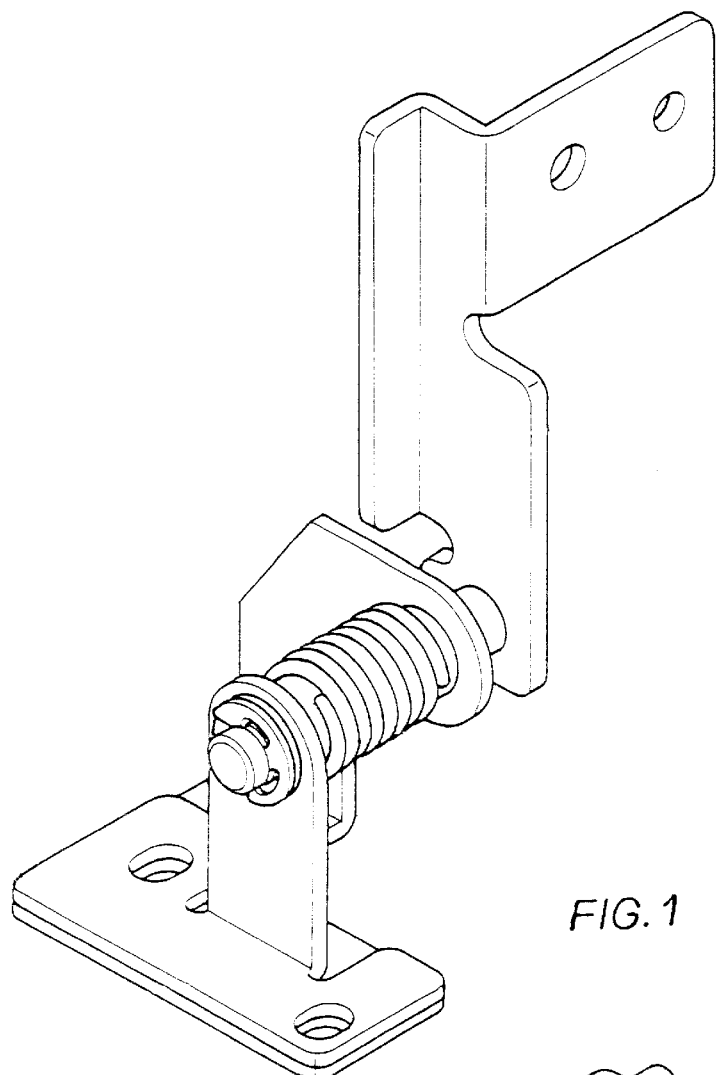
FIG. 1 is a perspective view of a conventional spring-loaded hinge assembly for connecting a monitor to a base thereof.
Figure 2:
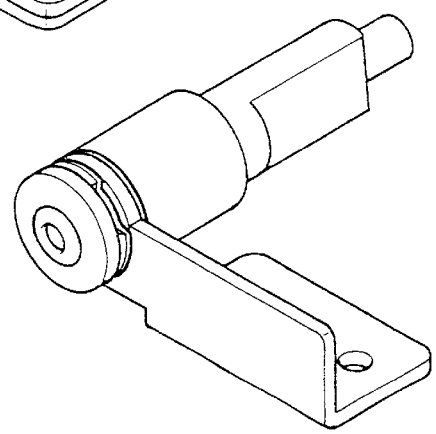
FIG. 2 is a perspective view of another conventional hinge assembly for connecting a monitor to a base thereof.
Figure 3:
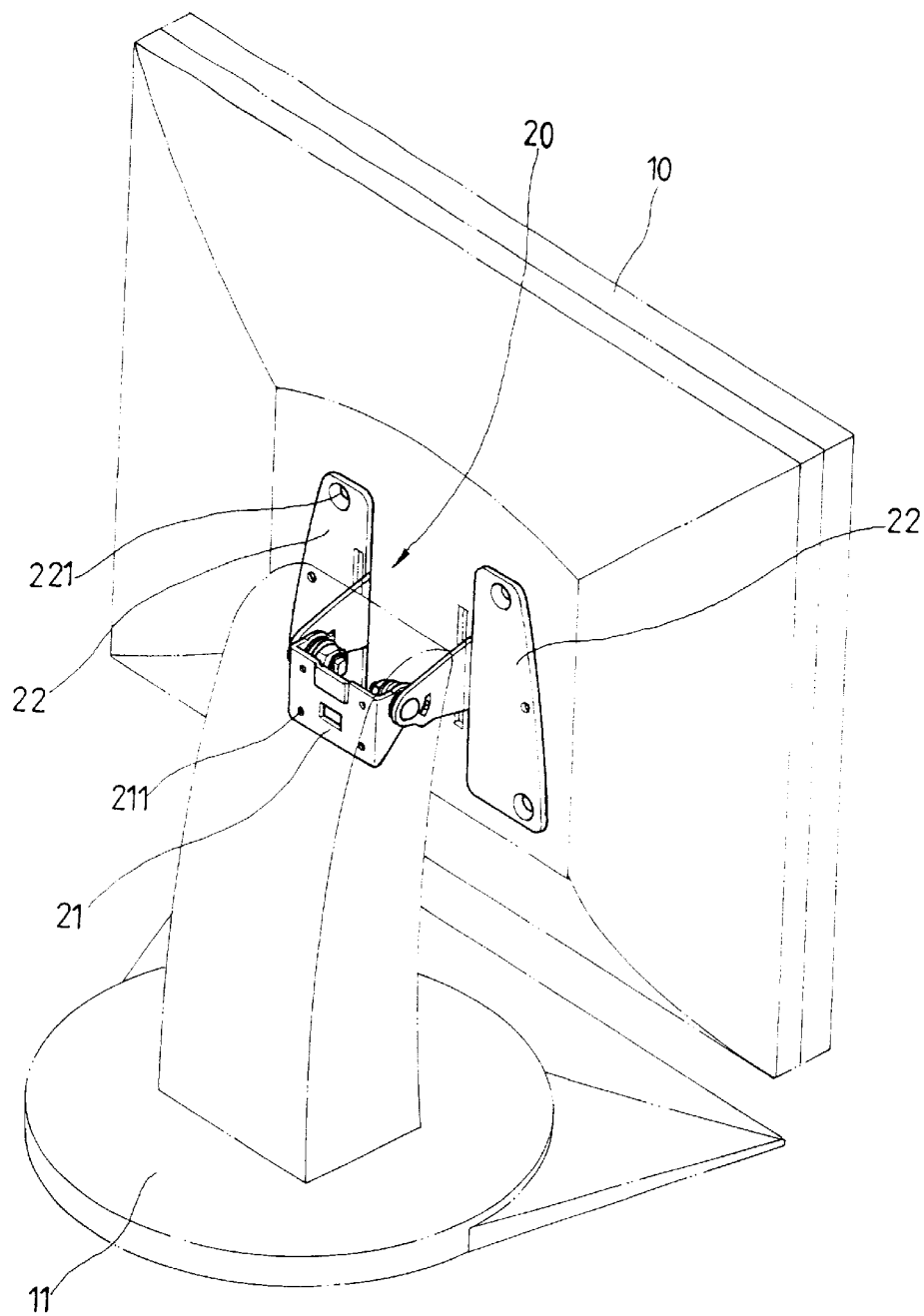
FIG. 3 is a rear perspective view of a hinge assembly for connecting a monitor to a base thereof according to a first embodiment of the present invention.
Figure 4:
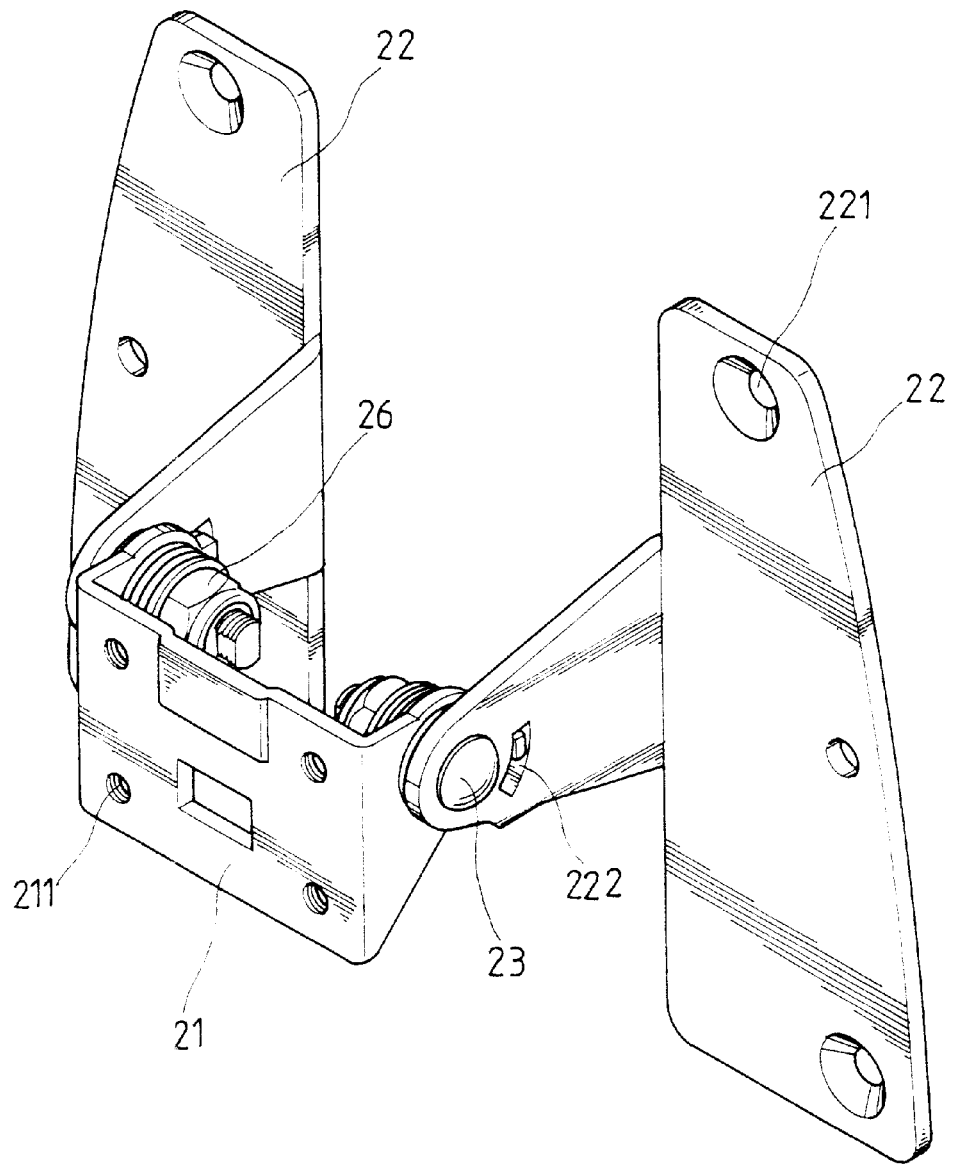
FIG. 4 is an enlarged and assembled perspective view of the hinge assembly shown in FIG. 3.
Figure 5:
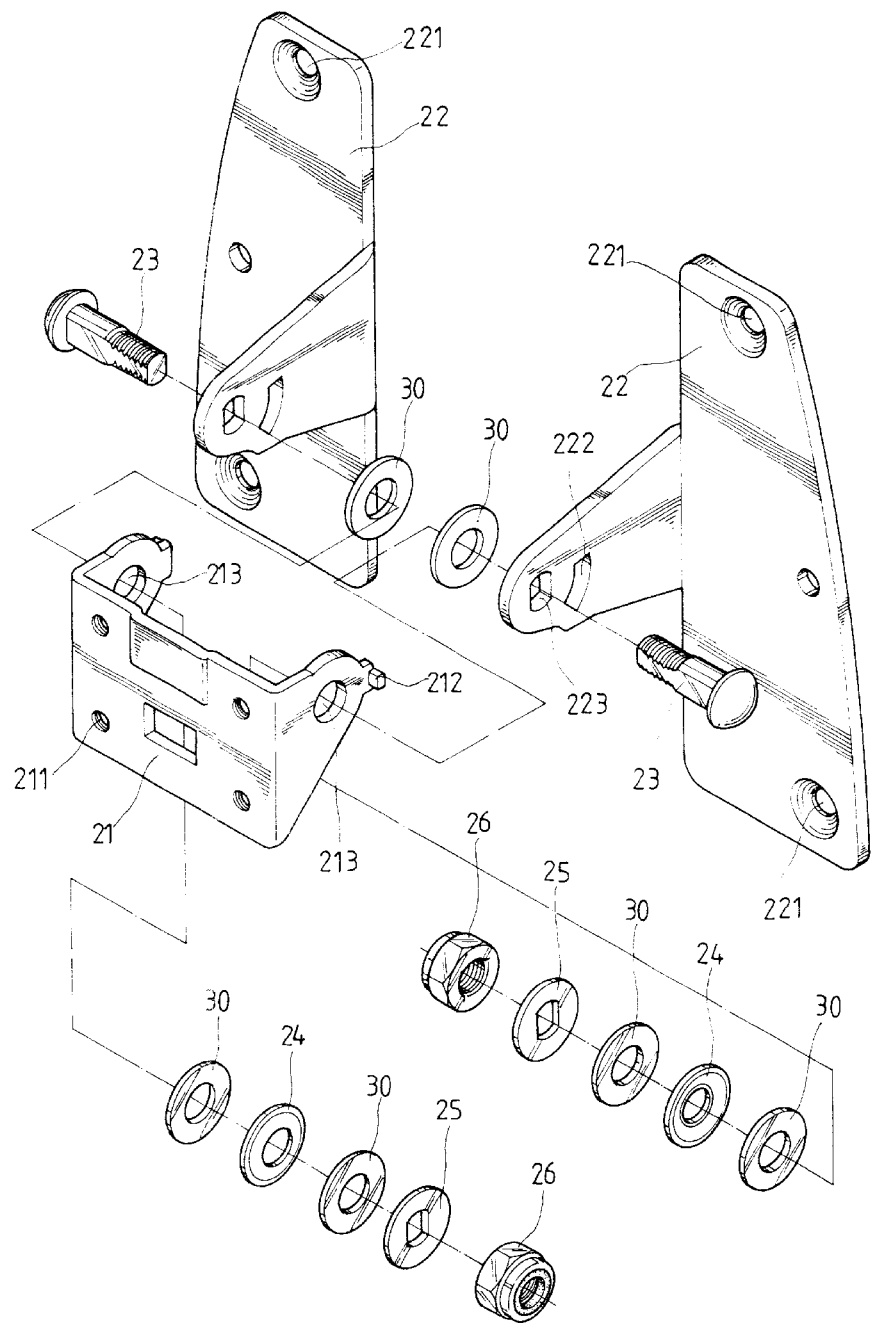
FIG. 5 is an exploded perspective view of FIG. 4.
Figure 6:
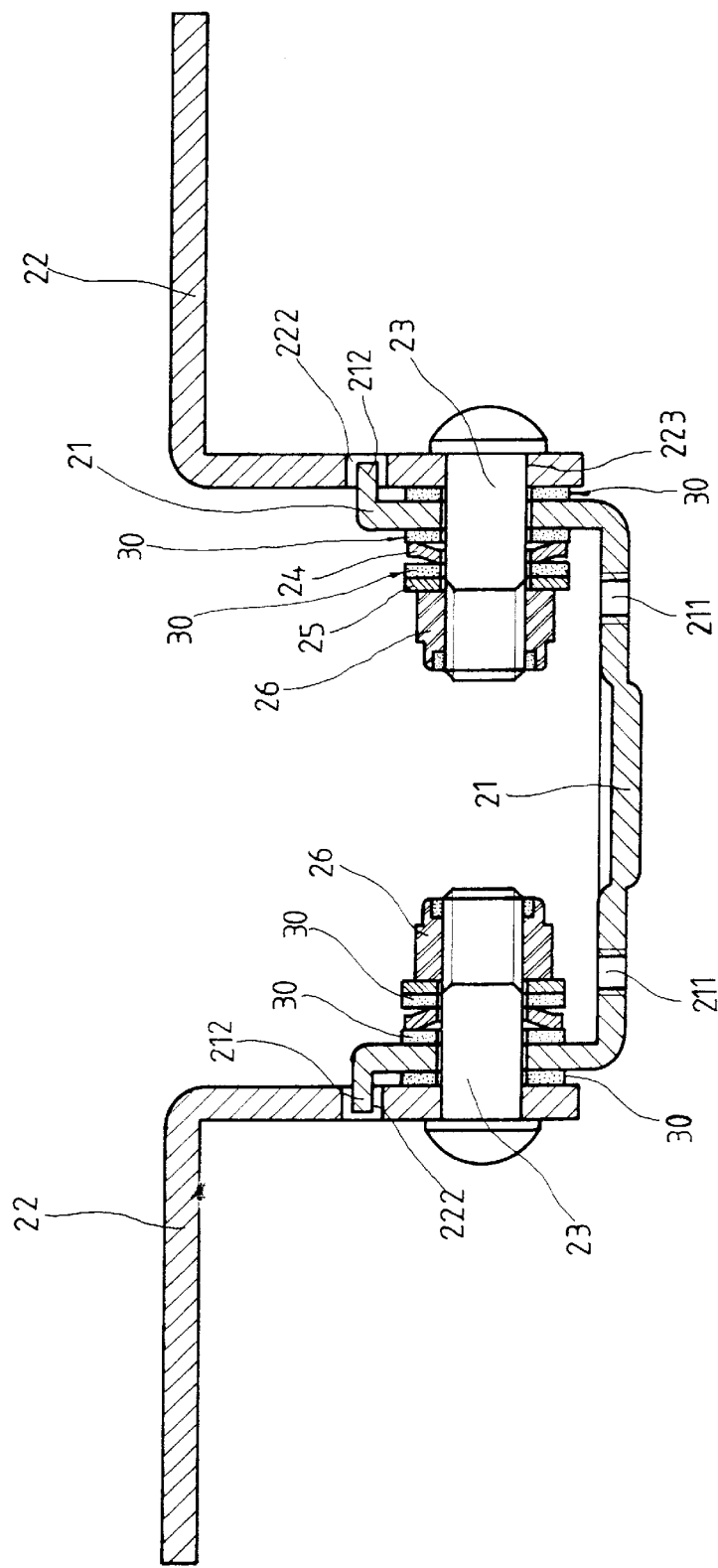
FIG. 6 is a sectioned elevation of the hinge assembly of FIG. 4.

Please refer to FIGS. 3 through 6. Generally, a monitor 10 of a computer is supported on a base 11. The monitor 10 is pivotally connected to the base 11 by means of a hinge assembly 20. The hinge assembly 20 according to a first embodiment of the present invention is shown in FIGS. 3 to 6 and mainly includes a base-side support bracket 21 and a monitor-side bracket set 22, which are provided at predetermined positions with screw holes 211 and 221, respectively, in order to be screwed onto, for example, the base 11 and a back of the monitor 10. The base-side support bracket 21 and the monitor-side bracket set 22 may be of any suitable configurations, depending on the designs of the base 11 and the monitor 10.

In the illustrated first embodiment, the base-side support bracket 21 is a U-shaped member and is provided at outer sides of two forward extended side arms with two outward and sideward projected lugs 212, and the monitor-side bracket set 22 includes two laterally symmetrical bracket members 22, each having a rearward extended arm portion. The two arm portions of the bracket members 22 are provided with an arcuate slot 222 each, such that the lugs 212 of the base-side support bracket 21 correspondingly extend into the arcuate slots 222 when the base-side support bracket 21 and the monitor-side bracket set 22 are assembled to one another. The arcuate slots 222 define a range of angular degrees within which the monitor-side bracket set 22 could be pivotally turned about the lugs 212 relative to the base-side support bracket 21, so that the monitor 10 would not be overly turned. The base-side support bracket 21 and the monitor-side bracket set 22 are screwed together to be pivotally turnable relative to each other by extending inward at each side a square neck bolt 23 through a square pivot hole 223 on the arm portion of the bracket member 22, a round pivot hole 213 on the side arm of the base-side support bracket 21, and then through at least one elastic washer 24 and an anti-skid washer 25 before engaging with a nut 26, so that the square neck bolt 23 constitutes a pivot shaft for the hinge assembly 20 of the present invention.

The hinge assembly 20 of the present invention is characterized in that a separate washer 30 of a selected thickness is disposed between any two adjacent components of the assembly, including the side arms of the base-side support bracket 21 and the arm portions of the monitor-side bracket set 22, that is, the round pivot holes 213 and the square pivot holes 223; the side arms of the base-side support bracket 21 and the elastic washers 24, and the elastic washers 24 and the anti-skidding washers 25. The separate washer 30 is made of a highly pressure-resistant and highly wear-resistant material, such as high molecular polymers. For example, the separate washer 30 may be made of Teflon (polytetra fluoro ethene), Nylon, Polvamide, ABS (Acrilonitrile Buta Styrene Resin), PC (Polycarbonate) and Bakelite (Synthetic Resin Condensation Products of Cresol or Phenol and Formaldehyde or other materials of similar property. The base-side support bracket 21, the monitor-side bracket set 22, and the washers 24, 25, 30 are locked together between the square neck bolts 23 and the nuts 26 with an adequate torque selected according to a load of the monitor 10. The separate washers 30 provide a separating layer between any two adjacent components of the hinge assembly 20, including the base-side support bracket 21, the monitor bracket set 22, the elastic washers 24, and the anti-skidding washers 25, so that these components are separated without direct contacting with and rubbing against one another. The separate washers 30 form the primary friction surfaces in the hinge assembly 20. That is, all other components as mentioned above do not contact with one another but directly frictionally contact only with surfaces of the separate washers 30. Since the separate washers 30 are made of highly pressure-resistant and highly wear-resistant material, it is possible to tighten the nuts 26 against the square neck bolts 23 with a specific torque, so as to generate sufficient and adequate frictional force between the separate washers 30 and other components of the hinge assembly 20 in contact with the washers 30. In other words, by tightening the nuts 26 under a controlled force, a desired magnitude of frictional force could be adjustably obtained to serve as a supporting force for the monitor 10 to stay at any desired angle relative to the base 11.

Figure 7:
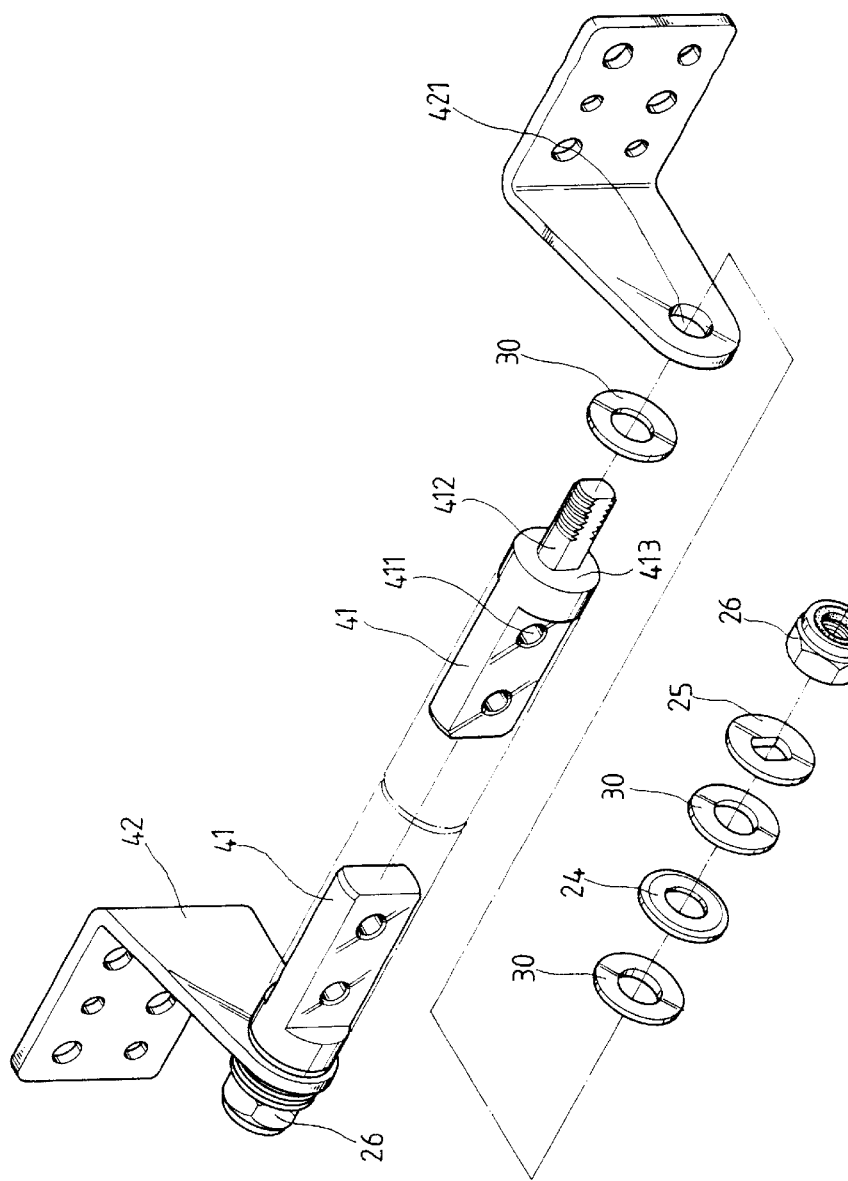
FIG. 7 is an exploded perspective view of a hinge assembly for connecting a monitor to a base thereof according to a second embodiment of the present invention.

When other components of the hinge assembly 20 are in highly frictional contact with the separate washers 30, they are also effectively prevented from becoming quickly worn-off or rusted. Thus, it is not necessary to apply anti-rust grease or lubricant on these components, and the assembling thereof could be done more conveniently. The highly pressure-resistant property of the separate washers 30 allow a consumer to set a widened range of torque in tightening the nuts 26 against the bolts 23. That is, the hinge assembly 20 of the present invention provides widened ranges for torque and load and can therefore be used with a wide range of monitor products rather than with only one specific monitor product. Manufacturers need not to design different hinge assemblies to match with monitor products of different toques and loads. It is to be noted that the locking of the components of the hinge assembly 20 with a desired torque is not necessarily limited to the use of nuts 26 and square neck bolts 23. The above-mentioned components may also be locked together through riveting. Please refer to FIG. 7 in which a hinge assembly 40 for pivotally connecting a monitor 10 to a base 11 thereof according to a second embodiment of the present invention is shown. The hinge assembly 40 is a variant of the hinge assembly 20 and the two assemblies are functionally equivalent. The hinge assembly 40 mainly includes a base-side support shaft 41 and a monitor-side bracket set 42 consisting of two laterally symmetrical bracket members 42. The hinge assembly 40 is different from the hinge assembly 20 mainly in their base-side supports. The hinge assembly 20 has a base-side support in the form of a U-shaped support bracket 21 while the hinge assembly 40 has a base-side support in the form of a linear support shaft 41. The support shaft 41 may consist of one integral piece of shaft or two separate pieces of shafts. In either case, the base-side support shaft 41 is provided with screw holes 411 for fixedly mounting the shaft 41 to the base 11. Two outer ends of the support shaft 41 are provided with two round end surfaces 413 and two square neck bolts 412 extended from the round end surfaces 412. By outward extending each square neck bolt 412 through a pivot hole 421 provided on each monitor-side bracket member 42 and then sequentially through at least one elastic washer 24 and an anti-skidding washer 25 to engage with a nut 26, the square neck bolt 412 constitutes a pivot shaft for the hinge assembly 40 of the present invention.

The hinge assembly 40 of the present invention is characterized in that a separate washer 30 of a selected thickness is disposed between any two adjacent components of the assembly, including the base-side support shaft 41 and the monitor-side bracket set 42, that is, the round end surfaces 413 and the pivot holes 421, the monitor-side support bracket members 42 and the elastic washers 24, and the elastic washers 24 and the anti-skidding washers 25. The separate washers 30 in the hinge assembly 40 are functionally equal to that in the hinge assembly 20.

Since separate washers 30 are disposed between any two adjacent components of the hinge assembly 20, 40, they had better have a suitably limited thickness to enable the assembled pivot shafts to have a well-controlled overall thickness. And, to provide the pivot shafts with enhanced endurance, an increased number of elastic washers 24 may be used. Thus, the thickness for the separate washer 30 is selected depending on a magnitude of locking torque designed for the entire hinge assembly and the number of the elastic washers 24 to be used on the pivot shafts.

To prove the hinge assemblies of the present invention have a performance meeting high-level requirements, the applicant has sent samples to be mass-produced to SGS Taiwan Ltd., a Taiwanese representative of SGS Group (Societe Generale de Surveillance), which is a world-class lab test center, for conducting high-standard Hinge Endurance Test and High Temperature & Humidity Test on these samples. According to the test reports, the tested samples made according to the present invention are noise-free and functionally perfect after having operated 25,000 cycles; and, have slightly tightened pivot shafts but are noise-free and functionally perfect to keep normal operation after having operated 30,000 cycles; and, function normally in environments before and after 70° C. and 70%RH are reached. All these tests prove the present invention is improved and practical for use.

What is claimed is:

1. A hinge assembly for connecting a monitor to a base thereof, comprising a base-side support bracket and a monitor-side bracket set consisting of two symmetrical bracket members, which are provided at predetermined positions with mounting holes in order to be fixedly mounted onto said base and a back of said monitor; two outer ends of said base-side support bracket being provided with two round end surfaces, and two square neck bolts extended from said round end surfaces; said base-side support bracket and said monitor-side bracket set being fastened together to be pivotally turnable relative to each other by outward extending each said square neck bolt through a pivot hole provided on each said monitor-side bracket member and then sequentially through at least one elastic washer and an anti-skidding washer to engage with a fastening means, so that said square neck bolt constitutes a pivot shaft for said hinge assembly; said hinge assembly being characterized in that a separate washer made of a highly pressure-resistant and wear-resistant material, selecting from the group consisting of polytetra fluoro ethene, polyamide, acrilonitrile buta styrene, polycarbonate and synthetic resin condensation products of cresol or phenol and formaldehyde and having a predetermined thickness is disposed between each of said round end surfaces of said base-side support bracket and said monitor-side bracket members, said monitor-side support bracket members and said elastic washers, and said elastic washers and said anti-skidding washer and wherein said base-side support shaft includes two separate pieces of shafts.

2. The hinge assembly for connecting a monitor to a base thereof as claimed in claim 1, wherein said fastening means is a nut.

3. The hinge assembly for connecting a monitor to a base thereof as claimed in claim 1, wherein said fastening means is a rivet.

4. The hinge assembly for connecting a monitor to a base thereof as claimed in claim 1, wherein said fastening means is tightened against said square neck screw with a preset torque.

* * * * *